(12) United States Patent
Tjäder et al.

(10) Patent No.: US 12,515,413 B2
(45) Date of Patent: Jan. 6, 2026

(54) ULTRASOUND THREAD WELDING

(71) Applicant: Bayer Oy, Turku (FI)

(72) Inventors: Taina Tjäder, Piispanristi (FI); Joonas Mikkonen, Lempäälä (FI); Antti Töyrylä, Turku (FI); Jari Riski, Parainen (FI); Petri Perälä, Paimio (FI); Heikki Lyytikäinen, Naantali (FI); Esko Moisala, Asikkala (FI); Juuso Pohjola, Turku (FI); Jorma Roine, Turku (FI)

(73) Assignee: Bayer Oy, Turku (FI)

( * ) Notice: Subject to any disclaimer, the term of this patent is extended or adjusted under 35 U.S.C. 154(b) by 241 days.

(21) Appl. No.: 18/286,466

(22) PCT Filed: Apr. 7, 2022

(86) PCT No.: PCT/EP2022/059213
§ 371 (c)(1),
(2) Date: Oct. 11, 2023

(87) PCT Pub. No.: WO2022/218797
PCT Pub. Date: Oct. 20, 2022

(65) Prior Publication Data
US 2025/0050591 A1    Feb. 13, 2025

(30) Foreign Application Priority Data
Apr. 14, 2021    (EP) .................................... 21168237

(51) Int. Cl.
*B29C 65/08*    (2006.01)
*B29L 31/00*    (2006.01)
(52) U.S. Cl.
CPC ......... *B29C 65/08* (2013.01); *B29L 2031/753* (2013.01)

(58) Field of Classification Search
CPC ......... B29C 65/08; B29C 66/69; B29C 66/71; B29C 66/81423; B29C 66/81427; B29C 66/81431
(Continued)

(56) References Cited

U.S. PATENT DOCUMENTS

| 3,386,870 A | 6/1968 | Morin |
| 4,075,046 A | 2/1978 | MacDonald |

(Continued)

FOREIGN PATENT DOCUMENTS

| EA | 36008 | 9/2020 |
| EP | 1009288 | 6/2000 |

(Continued)

OTHER PUBLICATIONS

EPO, International Search Report for International Patent Application No. PCT/EP2022/059213, Aug. 12, 2022, 4 pages.

(Continued)

*Primary Examiner* — James D Sells
(74) *Attorney, Agent, or Firm* — IP Spring

(57) ABSTRACT

According to an aspect of the present invention, there is provided an apparatus for ultrasonic welding of a removal thread (1) of an intrauterine system (2). The apparatus comprises a welding jig (3) comprising a welding groove (4), the welding groove having a length Lg, a width Wg and a depth Dg and a bottom (5) with concave shape. The apparatus further comprises a sonotrode (6) having a length Ls that is 150-220% of Lg, a width Ws of a welding tip (7) of the sonotrode that is 80-98% of Wg and a depth Ds. Further, the welding tip of the sonotrode has a concave shape.

15 Claims, 3 Drawing Sheets

(58) Field of Classification Search
USPC .......................................................... 156/73.1
See application file for complete search history.

(56) References Cited

U.S. PATENT DOCUMENTS

| 6,174,324 | B1 * | 1/2001 | Egan | ..................... | A61F 2/0811 |
| | | | | | 606/228 |
| 6,286,746 | B1 * | 9/2001 | Egan | ................. | B29C 66/81433 |
| | | | | | 156/73.2 |

FOREIGN PATENT DOCUMENTS

| EP | 2673230 | 12/2013 |
| FR | 2729940 | 8/1996 |
| JP | H03132334 | 6/1991 |
| RU | 2019111175 | 11/2020 |
| WO | 2012107464 | 8/2012 |

OTHER PUBLICATIONS

EPO, Written Opinion for International Patent Application No. PCT/EP2022/059213, Aug. 12, 2022, 11 pages.

Federal Service for Intellectual, Office Action (with English translation) for Russian Patent Application No. 2023129321/05, Aug. 13, 2025, 12 pages.

* cited by examiner

ULTRASOUND THREAD WELDING

CROSS-REFERENCE TO RELATED APPLICATIONS

The present application is the U.S. National Stage filing under 35 U.S.C. § 371 of International Patent Application No. PCT/EP2022/059213, filed on Apr. 7, 2022, which in turn claims priority under 35 U.S.C. § 119(a) and/or PCT Article 8 to European Patent Application No. 21168237.2, filed on Apr. 14, 2021, which is incorporated herein by references in its entirety.

FIELD

The present invention relates to an apparatus for ultrasonic welding of a removal thread of an intrauterine system, as well as a method for ultrasonic welding of a removal thread of an intrauterine system.

BACKGROUND AND OBJECTS

Intrauterine systems (IUS) typically comprise a body and either a copper spring or a container comprising a contraceptive compound, arranged on the body. They also comprise removal threads that are long enough to protrude from the uterus once the IUS is located inside the uterus. The removal threads are thus used to pull the IUS out once the IUS reaches the end of its use time or if it needs to be removed for some other reason. Moreover, the removal threads are typically used to hold the IUS in the inserter during storage, transport and the insertion procedure.

Typically, the removal threads are attached to the body of the IUS by knotting, for example as disclosed in WO 2012/107464. However, as the IUS's are positioned inside the uterus using inserters, and typically the inserters pass through the cervix, there is a need to provide both IUS's and their inserters having a smaller diameter for the comfort of the patient.

Ultrasonic welding is a known technique as such, and it is used in many industrial applications. It is based on high-frequency ultrasonic acoustic vibrations that are applied locally to items being held together under pressure to create a solid-state weld. It is commonly used for plastics and metals, and especially for joining dissimilar materials.

In view of the above disadvantages, it is an aim of the present disclosure to provide an apparatus and method for attaching a removal thread to an IUS, that leads to a reliable attachment that does not increase the cross-sectional dimensions of the IUS. Advantageously, the method is also fast, at least faster than the known knotting process. A further aim is to provide a removal thread that does not cause mechanical irritation of the uterine tissue.

SUMMARY OF THE INVENTION

The invention is defined by the features of the independent claims. Some specific embodiments are defined in the dependent claims.

According to a first aspect, there is provided an apparatus for ultrasonic welding of a removal thread of an intrauterine system, comprising a welding jig comprising a welding groove, the welding groove having a length $L_g$, a width $W_g$ and a depth $D_g$ and a bottom with concave shape, a sonotrode having a length $L_s$ that is 150-220% of $L_g$, a width $W_s$ of a welding tip of the sonotrode that is 80-98% of $W_g$ and a depth $D_s$, wherein the welding tip of the sonotrode has a concave shape.

According to a second aspect, there is provided a method for ultrasonic welding of a removal thread of an intrauterine system using the above apparatus, comprising:

arranging a first string of thread at the bottom of the welding groove, along its length;

arranging a second string of thread on top of the first string of thread in the welding groove, along its length;

arranging the welding tip on top of the second string of thread in the welding groove, along its length; and welding the first and second string of threads together.

According to a third aspect, there is provided an intrauterine system comprising a removal thread attached using the above method, prepared by the above apparatus.

DETAILED DESCRIPTION

Figure 1:
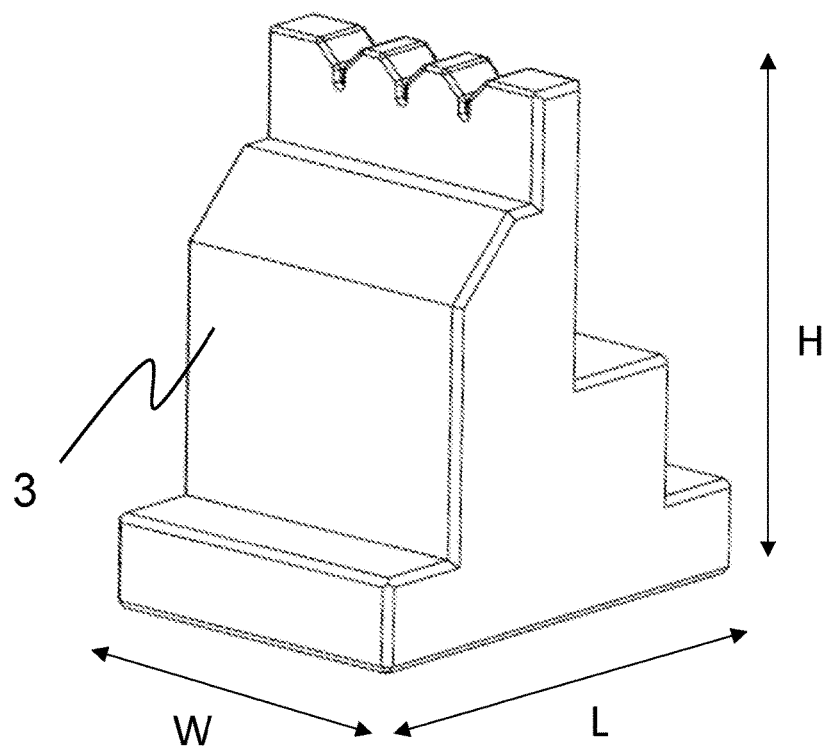
FIG. 1 illustrates an apparatus for ultrasonic welding in accordance with an embodiment of the present invention.

The present description relates to an apparatus for ultrasonic welding of a removal thread of an intrauterine system, comprising a welding jig comprising a welding groove, the welding groove having a length $L_g$, a width $W_g$ and a depth $D_g$ and a bottom with concave shape, a sonotrode having a length $L_s$ that is 150-220% of $L_g$, a width $W_s$ of a welding tip of the sonotrode that is 8098% of $W_g$, and a depth $D_s$, wherein the welding tip of the sonotrode has a concave shape.

The present apparatus and method for attaching a removal thread to an IUS leads thus to an attachment which has a slightly rounded shape, such as oval shape, and has a certain length along the length of the removal threads. Thus, this attachment is highly unlikely to get jammed inside an inserter and detachment of the IUS from the inserter is smooth. Ultrasound welding also reduces risk of frying of the thread in the production and is faster than knotting. The ultrasound welding is also easier to automate, leading to more reliable end results.

In the present apparatus, the welding groove is designed so as to ensure correct positioning of the removal threads during welding. To this end, the bottom of the welding groove has a concave shape, having preferably essentially a shape such that a lower part of a first removal thread fits therein snugly, i.e. that it does not slide away when pressure is applied to it. Thus, when a second removal thread is arranged on top of the first one, and the sonotrodes' welding tip is applied on the second removal thread, the two removal threads stay essentially in place. To this end, the welding tip of the sonotrode also has a concave shape, having preferably essentially a shape such that an upper part of the second removal thread fits therein snugly, i.e. that it does not slide away when pressure is applied to it. The width of the welding groove is preferably essentially such that a removal thread fits therein such that it can be arranged in the welding groove without being frayed by forced friction against the walls of the welding groove, but also such that they do not roll or slide away when a pressure is applied thereon. The aim is thus that the two removal threads stay one on top of the other during welding, i.e. that the width of the welding groove is selected such that it does not allow the upper thread to slide or roll next to the lower thread. These features of the welding jig and the sonotrode ensure that the resulting ultrasound weld is as smooth and homogenous as possible, thus leading to a strong and reliable attachment of the removal threads into the IUS.

The sonotrode and thus its welding tip are applied against the removal thread with a certain pressure, and this pressure has an influence on the quality of the obtained weld. The welding tip is in contact with the removal thread, and the ultrasound energy is created by vibrating the sonotrode. This leads to heating of the material of the removal thread, leading to the two threads to be welded together. The sonotrode is preferably kept in place until the welded joint has cooled down to ambient temperature.

The bottom of the welding groove is concave, so as to obtain an attachment that does not significantly differ from the overall aspect of the removal thread, i.e. it is not desired to have a square or rectangular cross section on the removal thread, but rather a rounded cross section. Typically, the obtained cross section is oval, as the two threads are attached together one on top of the other. Thus, according to an embodiment, the concave shape of the bottom of the welding groove has a radius of curvature of 0.1-0.2 mm. According to another embodiment, the concave shape of the welding tip has a radius of curvature of 0.1-0.2 mm. Most typically, the radius of curvature of the bottom of the welding groove is identical to the radius of curvature of the welding tip. In one embodiment, the radius of curvature of both these parts is 0.16 mm. The radius of curvature of each of these parts can be independently for example from 0.1, 0.11, 0.12, 0.13, 0.14, 0.15, 0.16, 0.17 or 0.18 mm up to 0.12, 0.13, 0.14, 0.15, 0.16, 0.17, 0.18, 0.19 or 0.2 mm. The height of the curved part can be for example 0.06 mm (the height here meaning the difference in distance of the level of the sides of the curve and the bottom of the curve).

The dimensions of the apparatus are selected such that they are suitable for the removal thread used and lead to the desired strength properties. Some examples of suitable dimensions are given below.

According to an embodiment, the length $L_g$ of the welding groove of the welding jig is 2.5-20 mm. The length $L_g$ can be for example from 2.5, 3, 4, 4.5, 5, 5.5, 6, 7, 9, 10, 12, 14 or 16 mm up to 4, 4.5, 5, 5.5, 6, 7, 9, 10, 12, 14, 16, 18 or 20 mm. According to another embodiment, the length $L_s$ of the sonotrode is 180-210% of $L_g$. The length $L_s$ of the sonotrode can thus be for example from 150, 155, 160, 165, 170, 175, 180, 185, 190 or 200% up to 160, 165, 170, 175, 180, 185, 190, 195, 200, 205, 210, 215 or 220% of $L_g$. According to an embodiment, the length $L_s$ of the sonotrode is 3.8-35 mm. The length $L_s$ can be for example from 3.8, 4, 4.5, 5, 6, 6.5, 7, 8, 10, 12, 15, 18, 20 or 25 mm up to 5, 6, 6.5, 7, 8, 10, 12, 15, 18, 20, 25, 28, 30, 32 or 35 mm. The length $L_s$ of the sonotrode is thus larger than the length $L_g$ of the welding groove of the welding jig. According to yet another embodiment, the length of the welding tip of the sonotrode can be for example 4-30 mm, such as 6 mm.

According to an embodiment, the width $W_g$ of the welding groove of the welding jig is essentially identical to a largest cross-sectional dimension of the thread to be welded. The width $W_g$ of the welding groove naturally needs to be such that the removal thread can arranged therein without friction (which may damage the thread). According to an embodiment, the width $W_g$ is 0.25-0.5 mm. The width $W_g$ can thus be for example from 0.25, 0.28, 0.3, 0.32, 0,35, 0.4 or 0.45 mm up to 0.28, 0.3, 0.32, 0.35, 0.4, 0.42, 0.45 or 0.5 mm. According to a still further embodiment, the width $W_s$ of the welding tip of the sonotrode is 84-98% of width $W_g$ of the welding groove. The width $W_s$ can thus be for example from 80, 82, 84, 86, 88, 90, 92, 93, 95 or 96% up to 84, 86, 88, 90, 93, 98, 96, 97 or 98% of the width $W_g$. For example, the width $W_g$ of the welding groove can be 0.01-0.05 mm larger than the width $W_s$ of the welding tip of the sonotrode. Thus, the sonotrode also fits snugly within the welding groove, and thus its concave welding tip allows the formation of the above-mentioned elliptical cross sectional shape for the welded thread.

According to yet another embodiment, the depth $D_g$ of the welding groove is larger than twice the largest cross-sectional dimension of the thread to be welded. Thus, the welding groove is deep enough to accommodate both the two threads to be welded together, but also at least part of the sonotrode. The depth $D_g$ can for example be 0.5-1.5 mm. The depth $D_g$ can thus be for example from 0.5, 0.6, 0.7, 0.8, 0.9, 1, 1.1, 1.2 or 1.3 mm up to 0.7, 0.8, 0.9, 1, 1.1, 1.2, 1.3, 1.4 or 1.5 mm.

The sonotrode is preferably made of a material that is suitable for manufacturing medical devices, such as titanium or precipitation hardened aluminium. According to an embodiment, the sonotrode is made of titanium. The sonotrode can be manufactured for example by machining a rod of the suitable material. The sonotrode typically comprises also an adaptor or other suitable part that allows its attachment to the ultrasound welding machine. However, for the dimensions discussed above, the sonotrode is understood to mean the part that does the actual welding, i.e. which vibrates under the ultrasound energy. The apparatus comprises typical equipment for an ultrasound welding apparatus, such as a booster and/or a converter. The ultrasound welding apparatus is typically a commercial device, for example the machine "Standard 50" sold by Rinco Ultrasonics AG.

According to a second aspect, there is provided a method for ultrasonic welding of a removal thread of an intrauterine system using the above apparatus, comprising:

arranging a first string of thread at the bottom of the welding groove, along its length;

arranging a second string of thread on top of the first string of thread in the welding groove, along its length;

arranging the welding tip on top of the second string of thread in the welding groove, along its length; and welding the first and second string of threads together.

According to an embodiment, the method uses the welding apparatus in energy mode, while the afterpulse setting can be either on or off. If afterpulse is set on, the afterpulse time can be set to for example to 100 ms. Moreover, the throttle parameter can be set to for example 4-10 setting. For high weld seam longitudinal tensile strength, a setting of 5-7 is preferred. This parameter adjusts the rate of force build-up between the welding tip and the object to be welded, and thus the welding power build-up rate. A hold-time of 100-1000 ms, such as 300 ms can be used. The hold time is the time of holding pressure on the object to be welded by the sonotrode after the welding stop condition has been met and welding has stopped. When the welding apparatus is used in the energy mode, the instant power absorbed by the object to be welded in short time intervals is added up. The ultrasonic welding is started when a given trigger pressure is reached. The ultrasonic welding stops when a given trigger energy level is achieved.

The system pressure can be for example 1.4-3.0 bars, the preferred range is 1.5-2.4, typically 2.0 bars. The trigger pressure can be for example 1.0-3.0 bar, such as 1.6 bar. The preferred range is 1.5-2.4 bar. The system pressure may thus be from 1.4, 1.6, 1.8, 2.0, 2.2 or 2.5 bars up to 1.6, 1.8, 2.0, 2.2, 2.5, 2.8 or 3.0 bars. The trigger pressure can be for example from 1.0, 1.2, 1.4, 1.6, 1.8, 2.0, 2.2 or 2.5 bars up to 1.4, 1.6, 1.8, 2.0, 2.2, 2.5, 2.8 or 3.0 bars. Trigger pressure is typically set relative to the system pressure, and for practical reasons it is preferred that is does not exceed the system pressure. The ultrasonic is triggered when the determined contact force of the welding tip on the object to be welded (for example a pressure difference in the pneumatic cylinder) is measured. The system pressure is the target value for this pressure difference.

The amplitude of the sonotrode can be for example 75-100%. The preferred range is 80-100% and the energy used may vary from 0.3 to 3.0 Ws. The preferred energy used is in the range of 0.5-1.5 Ws. For example, when using a converter with a gain of 2.50, the full absolute amplitude range is 12.75 µm when using the Standard 50 by Rinco Ultrasonics AG, with a VST 50 actuator and ADG 70-100 generator (70 kHz system). For this system, the relative amplitude can be for example 75-100%, which corresponds to the absolute amplitude range of 9.56-12.75 µm. Thus, the sonotrode and the converter gain setting together determine full absolute amplitude range. The different parameters of ultrasound welding do affect the end result. In addition to the above information, the concrete examples given below will allow a person skilled in the art to find out the suitable conditions for a given thread material and thickness of the thread.

According to a third aspect, there is provided an intrauterine system comprising a removal thread attached using the above method, prepared by the above apparatus. The intrauterine system may be any known system, such as having a T-shaped body with a copper string wound around the stem of the body, or a capsule containing therapeutically active agents(s) arranged around the body. The body of the IUS may also have any other form as is suitable for intrauterine use. Similarly, the materials used for the IUS are as known in the art. Typically, the IUS has a loop at its proximal end (i.e. the end that is closest to the cervix channel when the IUS is in place in the uterus), to which the removal threads are attached. In some IUS's, the removal thread is at the distal end of the IUS prior and during insertion, and it is pulled at the end of the insertion through the loop to a lock, whereby the removal threads are at the proximal end of the IUS after insertion.

The removal thread can be made of any material suitable for such use, typically medical grade thermoplastic polymers. Some suitable polymers are for example polypropylene (PP), polyethylene (PE), such as high density polyethylene (HDPE), polyamide PA, poly (vinylidene fluoride) (PVDF) or thermoplastic polyurethane (TPU). The polymers used should have a rather low moisture content, as more moisture creates more damping and therefore lowers weldability (as it would cause blistering). This is believed to be relevant at least for semi-crystalline polyamine and thermoplastic polyurethane.

In the following Experimental part, concrete examples of welding of the thread and the strengths of the resulting attachment are given to further illustrate the invention.

EXPERIMENTAL PART

Welding experiments were carried out, using a removal thread made of polypropylene homopolymer designed for filament extrusion (for example Eltex MED 100-MG03 by Ineos), having an essentially circular cross-section with a diameter of 0.27 mm. A removal thread having a diameter of 0.24 mm was also tested. The diameter of the removal thread could vary approximately +/−0.02 mm.

The ultrasound welding machine used was (Standard 50 by Rinco Ultrasonics AG, with a VST 50 actuator and ADG 70-100 generator), in "energy mode", as this ensures the same amount of welding energy for each welding action. The amplitude was 90% of that recommended for the polypropylene material by the manufacturer while the welding energy varied from 0.5 to 1.5 Ws. In most experiments (Table 1), the relative amplitude set for the ultrasonic welding machine was 90%. This value was the value recommended for the polypropylene material by the manufacturer. With the used converter gain value of 2.50, this corresponds to an absolute amplitude of 11.47 µm. Relative amplitudes of 83% and 86% were also tested (Table 1).

During preliminary testing, it was observed that for this material and configuration, lower welding energies meant that the threads were not properly melted together and hence the strength was too low, while a higher welding energy meant that threads were too much melted and the weld was deformed, having a film-like excess around the weld. This led to higher tearing force but lower tensile force. The hold time was a constant 300 ms and the frequency 69977 Hz. The width Wg of the welding jig and the width Ws of the welding tip of the sonotrode are given in Table 1 below, in millimetres.

Trigger pressure used in the experiments was 1.6 bar, and means the contact force of the sonotrode on the object to be welded. The throttle setting of 7 was used for the experiments, and afterpulse was not applied. When a pre-defined trigger pressure is achieved, the welding process starts In the Table 1 below, system pressure is the target pressure differential, which is measured between the top side and bottom side of the piston during the welding process. This quantity is proportional to the contact force of the welding tip on the thread to be welded. It is given in bars. The tests #1-7 were carried out with threads having a diameter of 0.27 mm and the tests #8 and 9 with threads having a diameter of 0.24 mm.

TABLE 1

| Test | Amplitude (%) | Energy (Ws) | System pressure (bar) | Wg (mm) | Ws (mm) |
|---|---|---|---|---|---|
| #1 | 90 | 1.5 | 2.0 | 0.35 | 0.30 |
| #2 | 86 | 1.5 | 2.0 | 0.35 | 0.30 |
| #3 | 90 | 1.5 | 1.7 | 0.35 | 0.30 |
| #4 | 90 | 1.0 | 2.0 | 0.35 | 0.30 |
| #5 | 90 | 0.5 | 2.0 | 0.35 | 0.30 |
| #6 | 90 | 0.6 | 2.0 | 0.32 | 0.30 |
| #7 | 83 | 1.0 | 1.6 | 0.35 | 0.30 |
| #8 | 83 | 1.0 | 1.6 | 0.26-0.30* | 0.30 |
| #9 | 90 | 1.0 | 2.0 | 0.26-0.30* | 0.26 |

(*close fit was ensured but the exact width was not measured)

During testing, it was observed that for this material and configuration, the welding travel (i.e. the extent the weld region is compressed during the welding process) was in practice the most useful value to observe (the travel was not a control parameter, and it cannot be directly set as a control parameter when operating in energy mode, but can be targeted by setting the other welding parameters). No clear correlation was observed with the weld strength if the welding travel value was between 0.09 and 0.17 mm, although slightly better consistency in the results was observed when the welding travel value was between 0.09 and 0.13 mm. Outside of this welding travel value area, the weld strength was lower. It is believed that if the welding travel is too small, the threads are not properly melted together, and if the welding travel is too long, the threads are too much compressed together and extra film-like material is formed around the weld and/or sharp edges are formed to the ends of the weld, making the weld weaker. Tensile strength of the obtained weld was tested following the principle of the procedure of ISO (ISO 7439:2015 (en), Copper-bearing contraceptive intrauterine devices-Requirements and tests; the tests were carried out as in this standard, but without use of the T-frame). Results for the test #1-#9 above are given in Table 2 below as average tensile strength in N for 1-90 parallel samples, depending on the test. The visual quality of the resulting weld was also assessed on a scale from 1-4 (1 being the worst and 4 being the best), taking also into account the film-like material if formed (which lowered the visual quality).

TABLE 2

| Test | Tensile strength (N) | Visual quality |
| --- | --- | --- |
| #1 | 17.08 | 1 |
| #2 | 15.57 | 1 |
| #3 | 14.40 | 2 |
| #4 | 21.60 | 3 |
| #5 | 20.68 | 4 |
| #6 | 21.19 | 4 |
| #7 | 19.57 | 2 |
| #8 | 14.57 | 1 |
| #9 | 14.48 | N/A |

It is believed that the lower tensile strength results for the thinner threads are caused by the lower diameter of the thread as well as of a smaller contact area of the threads in the weld region.

The welded threads were also compared to the same thread material that was attached to the IUS using a traditional knot (sailor's knot; "overhand-loop"), as is used in the commercial product Kyleena™. The tensile strength of samples according to test #6 (largest number of parallel samples, 90) above was on average 21.19 N, with a standard deviation of 1.36, while the tensile strength of the samples where the threads were attached by a knot (48 parallel samples) was 21.36 N with a standard deviation of 1.83.

Analog to the experiment described above further experiments were performed and are described below (Table 3).

The falling parameters were constant for all experiments described below (Table 3):
1) Thread: Eltex MED 100-MG03 thread by Ineos, which has an essentially circular cross-section with a diameter of 0.27 mm.
2) Wg=0.32 mm
3) Ws=0.30 mm.
4) Relative amplitude set for the ultrasonic welding machine=90%
5) Hold time=300 ms
6) Afterpulse=100 ms The data given in table 3 is averaged from a number of samples indicated by N (3 or 15).

TABLE 3

| N | Energy (J) | System pressure (bar) | Trigger pressure (bar) | Throttle | Tensile strength (N) | Visual qualtiy |
| --- | --- | --- | --- | --- | --- | --- |
| 3 | 0.4 | 2.0 | 1.5 | 5.5 | 15.4 | 2.5 |
| 3 | 1.2 | 2.0 | 1.5 | 5.5 | 19.1 | 3.3 |
| 3 | 0.4 | 2.4 | 1.9 | 5.5 | 18.7 | 2.8 |
| 3 | 1.2 | 2.4 | 1.9 | 5.5 | 16.1 | 3.0 |
| 3 | 0.4 | 2.2 | 1.7 | 5.5 | 19.2 | 3.0 |
| 3 | 1.2 | 2.2 | 1.7 | 5.5 | 19.4 | 3.0 |
| 3 | 0.8 | 2.0 | 1.5 | 5.5 | 21.2 | 3.2 |
| 3 | 0.8 | 2.4 | 1.9 | 5.5 | 18.3 | 3.0 |
| 15 | 0.8 | 2.2 | 1.7 | 5.5 | 19.3 | 3.3 |
| 3 | 0.8 | 2.2 | 1.7 | 4.5 | 17.8 | 3.8 |
| 3 | 0.8 | 2.2 | 1.7 | 6.5 | 19.5 | 3.8 |
| 3 | 0.4 | 2.0 | 1.5 | 4.5 | 15.9 | 2.5 |
| 3 | 0.4 | 2.0 | 1.5 | 6.5 | 15.8 | 2.5 |

It is submitted that a person skilled in the art is readily able to define optimum welding conditions for a given thread material, with a few simple tests.

DETAILED DESCRIPTION OF THE DRAWINGS

FIG. 1 illustrates an apparatus for ultrasonic welding in accordance with an embodiment of the present invention, illustrating a welding jig 3. The Figure shows the various directions of height H, width W and depth D as used in the present description. While the Figure shows each direction in general, it is to be understood that the directions are the same for the welding jig and the sonotrode.

Figure 2:
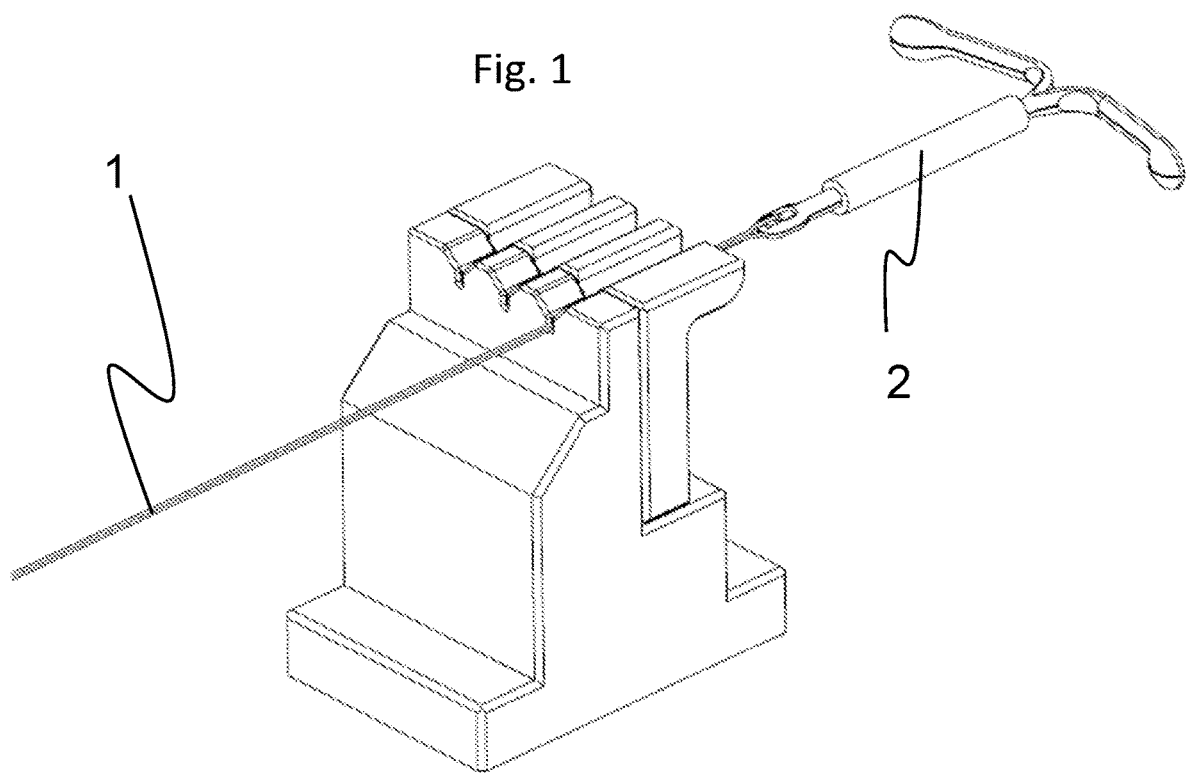
FIG. 2 shows the apparatus of FIG. 1 when prepared for use.
Figure 4:
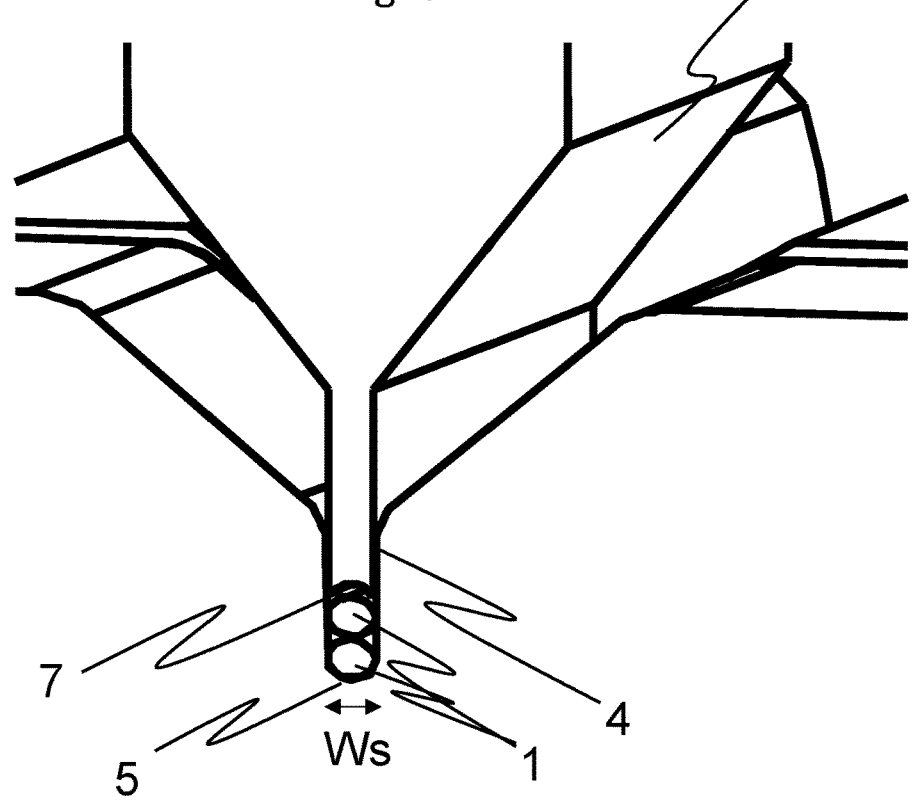
FIG. 4 illustrates a welding groove and a sonotrode according to an embodiment.

FIG. 2 shows the apparatus of FIG. 1 wherein an intrauterine system 2 and its removal threads 1 have been arranged so that the removal threads 1 are located in the welding jig's groove (shown in more detail in FIG. 4).

Figure 3:
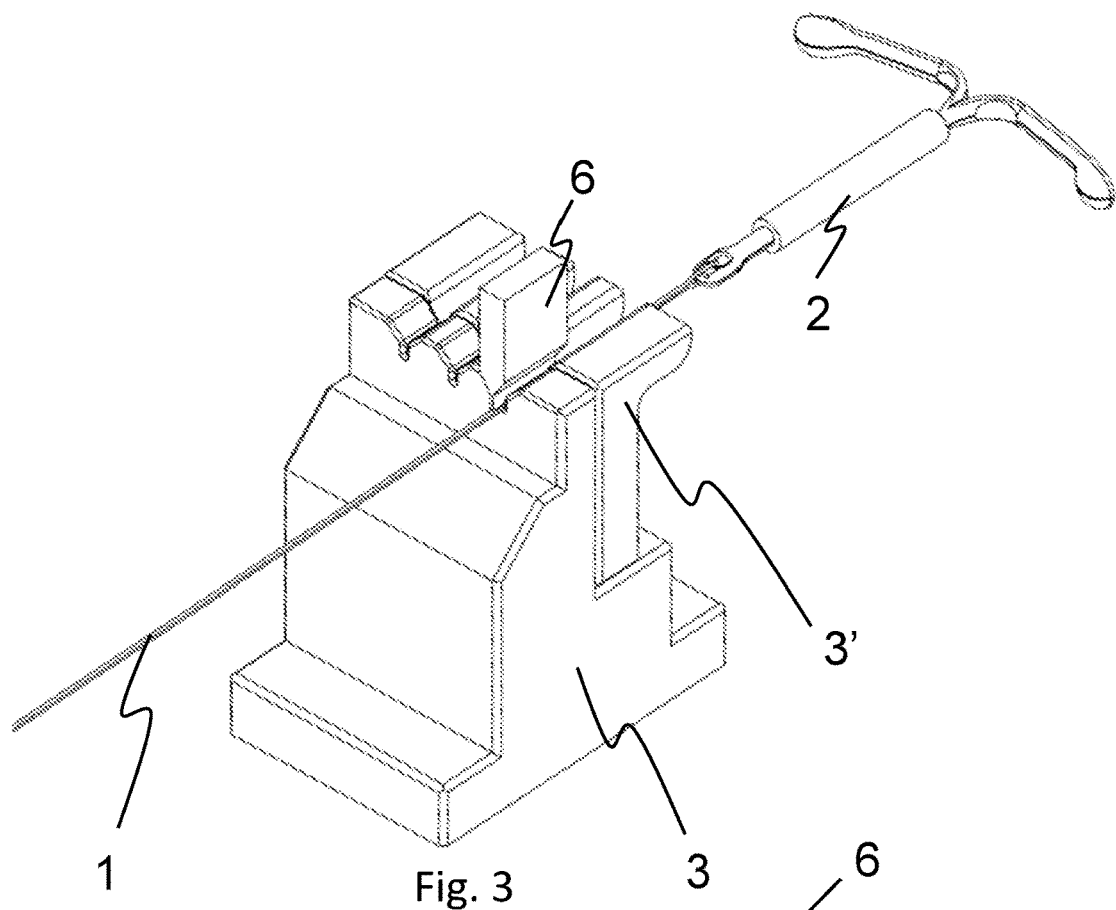
FIG. 3 illustrates the apparatus of FIG. 1 in use.

In FIG. 3, the sonotrode 6 has been arranged on top of the removal threads 1 along a certain length, to weld the removal threads 1 together. FIG. 3 also illustrates a supporting element 3', which is arranged in connection with the welding jig 3, to support the IUS and threads 1 on a longer distance than only the welding groove.

FIG. 4 illustrates a welding groove 4 and a sonotrode 6 according to an embodiment. The welding groove 4 has a concave bottom 5, i.e. the bottom of the welding groove is rounded. Ideally, and as is shown here, the concave shape of the bottom is essentially such that a first removal thread 1 first therein snugly. A second removal thread is arranged on top of the first removal thread, and a welding tip 7 of the sonotrode 6 is then applied on top of the second removal thread. Again, the shape of the welding tip 7 is concave, and ideally essentially identical to the shape of the removal thread. Similarly, as can be seen in this preferred embodiment, the width Ws of the welding jig is essentially identical to the diameter of the removal thread 1 (which is this embodiment are essentially spherical by their cross-section).

Figure 5:
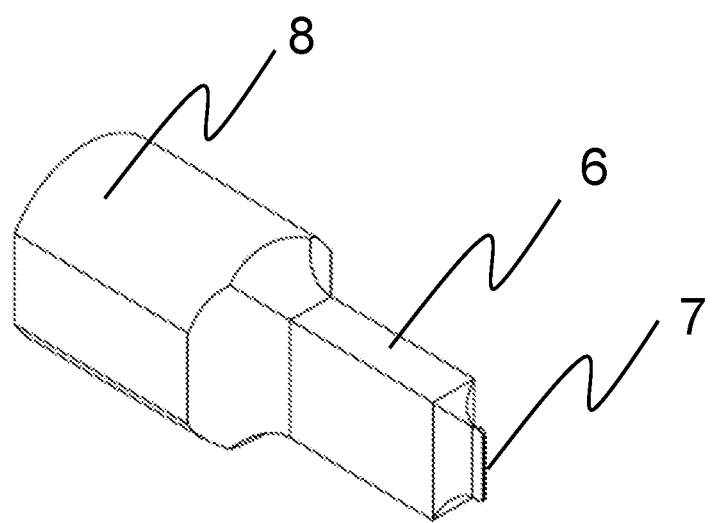
FIG. 5 illustrates a sonotrode according to another embodiment.

FIG. 5 illustrates a sonotrode (6) according to another embodiment. The Figure also shows the adaptor (8) to attach the sonotrode to the welding machine. The sonotrode's welding tip (7) is shown as a side view.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

The invention claimed is:

1. An apparatus for ultrasonic welding of a removal thread (1) of an intrauterine system (2), comprising:
    a welding jig (3) comprising a welding groove (4), the welding groove having a length Lg, a width Wg and a depth Dg and a bottom (5) with a concave shape,
    a sonotrode having a length Ls that is 150-220% of Lg, a width Ws of a welding tip (7) of the sonotrode that is 80-98% of Wg and a depth Ds,
    wherein the welding tip of the sonotrode has a concave shape.

2. The apparatus according to claim 1, wherein the concave shape of the bottom (5) of the welding groove (4) has a radius of curvature of 0.1-0.2 mm.

3. The apparatus according to claim 1, wherein the concave shape of the welding tip (7) has a radius of curvature of 0.1-0.2 mm.

4. The apparatus according to claim 1, wherein the length Lg is 2.5-20 mm.

5. The apparatus according to claim 1, wherein the width Wg is essentially identical to a largest cross-sectional dimension of the thread (1) to be welded.

6. The apparatus according to claim 5, wherein the width Wg is 0.25-0.5 mm.

7. The apparatus according to claim 1, wherein the depth Dg is larger than twice the largest cross-sectional dimension of the thread (1) to be welded.

8. The apparatus according to claim 7, wherein the depth Dg is 0.5-1.5 mm.

9. The apparatus according to claim 1, wherein the length Ls is 180-210% of Lg.

10. The apparatus according to claim 1, wherein the width Ws is 84-98% of width Wg.

11. The apparatus according to claim 1, wherein the sonotrode (6) is made of titanium or precipitation hardened aluminium.

12. A method for ultrasonic welding of a removal thread (1) of an intrauterine system (2) using an apparatus according to claim 1, comprising:
    arranging a first string of thread (1) at the bottom (5) of the welding groove (4), along its length;
    arranging a second string of thread on top of the first string of thread in the welding groove, along its length;
    arranging the welding tip (7) on top of the second string of thread in the welding groove, along its length; and
    welding the first and second string of threads together.

13. A method according to claim 12, wherein a system pressure is 1.6 to 2.4 bar.

14. A method according to claim 12 wherein the ultrasonic welding produces ultrasound energy that is 0.5-1.5 Ws.

15. An intrauterine system (2) comprising a removal thread (1) attached using the method of claim 12.

* * * * *